J. W. FITZ GERALD.
DRIVE MECHANISM.
APPLICATION FILED MAY 21, 1917.

1,262,318.

Patented Apr. 9, 1918.

Inventor
John W. FitzGerald

By Whittemore Hulbert & Whittemore
Attorneys

UNITED STATES PATENT OFFICE.

JOHN W. FITZ GERALD, OF DETROIT, MICHIGAN.

DRIVE MECHANISM.

1,262,318. Specification of Letters Patent. Patented Apr. 9, 1918.

Application filed May 21, 1917. Serial No. 169,894.

*To all whom it may concern:*

Be it known that I, JOHN W. FITZ GERALD, a citizen of the United States of America, residing at Detroit, in the county of Wayne and State of Michigan, have invented certain new and useful Improvements in Drive Mechanism, of which the following is a specification, reference being had therein to the accompanying drawings.

The invention relates to drive mechanisms for electric generators of that type in which the output of the generator is automatically regulated so as to remain substantially constant under varying speeds. More specifically, the invention is applicable to electrical generators used on motor vehicles and which must be operated under varying speeds of the engine. It is the object of the invention to obtain an improved construction of driving mechanism in which the tension upon the driving belt is automatically varied in proportion to torque, thereby relieving belt stresses when driven at high speed. To this end the invention consists in the novel construction as hereinafter set forth.

Figure 1:
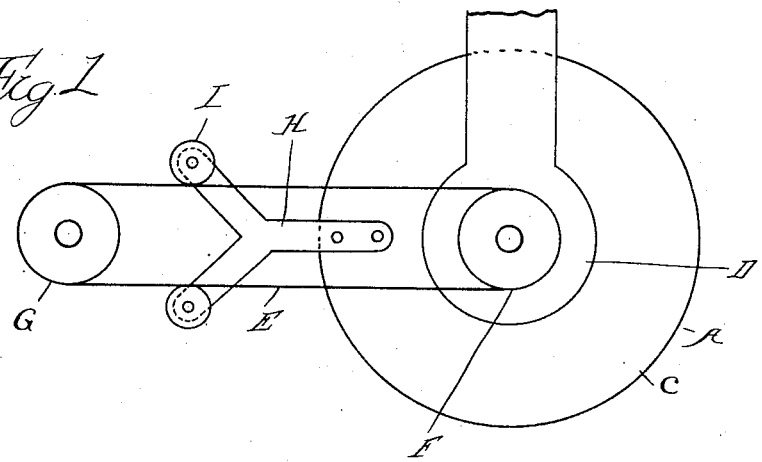
Figure 1 is a side elevation of the drive mechanism.
Figure 2:
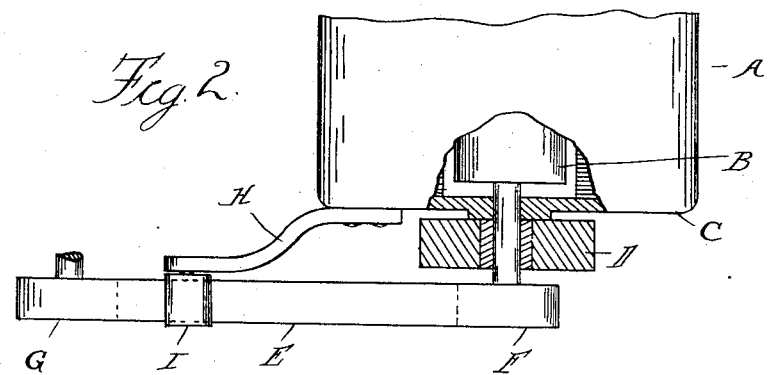
Fig. 2 is a plan view thereof.

A is an electric generator of the type described and which is so constructed or is provided with such regulating means as to maintain a substantially constant output under varying speeds of rotation. B is the rotor on said generator and C is the stator.

Instead of holding the stator immovable it is mounted upon suitable bearing D which permits of rotative adjustment thereof. E is a drive-belt for the rotor, engaging a pulley F thereon and a drive-pulley G which is driven from the engine by suitable means (not shown). H is an arm secured to the rotor, which carries one or more belt-tighteners I, preferably two, arranged upon opposite sides of the belt E.

With the construction as described, when the rotor B is driven through the belt E, the initial tension on said belt is only sufficient to impart movement when relieved from load. As soon, however, as the generator is under load, the magnetic draft of the rotor upon the stator will cause the rotative adjustment of the latter, thereby swinging the arm H and throwing one or the other of the pulleys I into contact with the belt. This will increase the tension thereon so as to continue the drive under increased load. On the other hand, when the speed increases beyond a predetermined point the automatic regulation of the generator will decrease the magnetic torque, which will react upon the arm H and pulley I to decrease the tension upon the belt.

What I claim as my invention is:

1. The combination with the rotor and stator of an electric generator, of a belt-drive for said rotor, a mounting for the stator permitting rotative adjustment thereof under the magnetic torque of the rotor, and a belt-tightener actuated by the movement of said stator, and coöperating with said belt to increase the tension thereof.

2. The combination with a rotor and stator of an electric generator, of a belt for driving the rotor, a mounting for the stator permitting of rotative adjustment under the magnetic torque of the rotor, an idler pulley for tightening the belt, and a connection between said pulley and stator by which the torque exerted on the stator will tighten the belt.

3. The combination with a rotor and stator of an electric generator, of a belt for driving the rotor, a mounting for the stator permitting rotative adjustment under the magnetic torque of the rotor, a pair of tightener pulleys on opposite sides of the belt, and a mounting for said pulleys connected to said stator, by which the torque due to the rotation of said rotor in opposite directions will effect the tightening of the belt.

4. The combination with the rotor and stator of an electric generator, of a belt-drive for said rotor, a mounting for said stator permitting a rotative adjustment thereof under the magnetic torque of the rotor, an arm projecting from said stator, and tightener pulleys mounted upon said arm upon opposite sides of said belt, whereby the magnetic torque of said rotor when rotating in either of opposite directions will effect a tightening of the belt.

In testimony whereof I affix my signature.

JOHN W. FITZ GERALD.